United States Patent
Wang et al.

(10) Patent No.: US 12,422,701 B2
(45) Date of Patent: Sep. 23, 2025

(54) FARADAY ROTATOR BALL LENS

(71) Applicant: Cisco Technology, Inc., San Jose, CA (US)

(72) Inventors: Shawn X Wang, Carlsbad, CA (US); Steffen Gloeckner, San Diego, CA (US); Michael P. Mack, San Diego, CA (US)

(73) Assignee: Cisco Technology, Inc., San Jose, CA (US)

( * ) Notice: Subject to any disclaimer, the term of this patent is extended or adjusted under 35 U.S.C. 154(b) by 413 days.

(21) Appl. No.: 18/148,851

(22) Filed: Dec. 30, 2022

(65) Prior Publication Data

US 2024/0219755 A1 Jul. 4, 2024

(51) Int. Cl.
*G02F 1/09* (2006.01)
*G02B 3/00* (2006.01)
*G02F 1/00* (2006.01)

(52) U.S. Cl.
CPC ........... *G02F 1/092* (2013.01); *G02B 3/0012* (2013.01); *G02B 3/0056* (2013.01); *G02B 3/0075* (2013.01); *G02F 1/0036* (2013.01); *G02F 1/093* (2013.01); *G02B 2003/0093* (2013.01)

(58) Field of Classification Search
CPC ........ G02F 1/092; G02F 1/0036; G02F 1/093; G02B 3/0012; G02B 3/0056; G02B 3/0075; G02B 2003/0093
See application file for complete search history.

(56) References Cited

U.S. PATENT DOCUMENTS

| | | | |
|---|---|---|---|
| 4,294,509 A | 10/1981 | Nagao | |
| 4,735,489 A * | 4/1988 | Tolksdorf | G02F 1/0036 359/324 |
| 6,002,512 A | 12/1999 | Bergmann et al. | |
| 8,168,939 B2 | 5/2012 | Mack et al. | |
| 11,163,126 B2 | 11/2021 | Mack et al. | |
| 2017/0293094 A1 | 10/2017 | Gamache et al. | |

FOREIGN PATENT DOCUMENTS

| | | |
|---|---|---|
| DE | 3432743 A1 | 3/1986 |
| EP | 0720033 A1 | 7/1996 |

* cited by examiner

*Primary Examiner* — James C. Jones
(74) *Attorney, Agent, or Firm* — Patterson + Sheridan, LLP (57) ABSTRACT

Embodiments here describe a Faraday rotator ball lens that can be used in an optical device to focus received light and prevent back reflections from reaching a light source. In one embodiment, the isolator ball lens includes an optic axis that should be aligned with the direction of the received light in order to rotate the light so that back reflections cannot reach the light source. To do so, the isolator ball lens is placed on a holder which is then vibrated, shaken, or an aerodynamic levitation is applied in the presence of a magnetic field. The magnetic field is aligned with a desired direction of the optic axis of the isolator ball lens as the ball lens. As a result, when the ball lens is moved, the magnetic field rotates the ball lens and aligns its optic axis in the desired direction.

20 Claims, 6 Drawing Sheets

Figure 1:
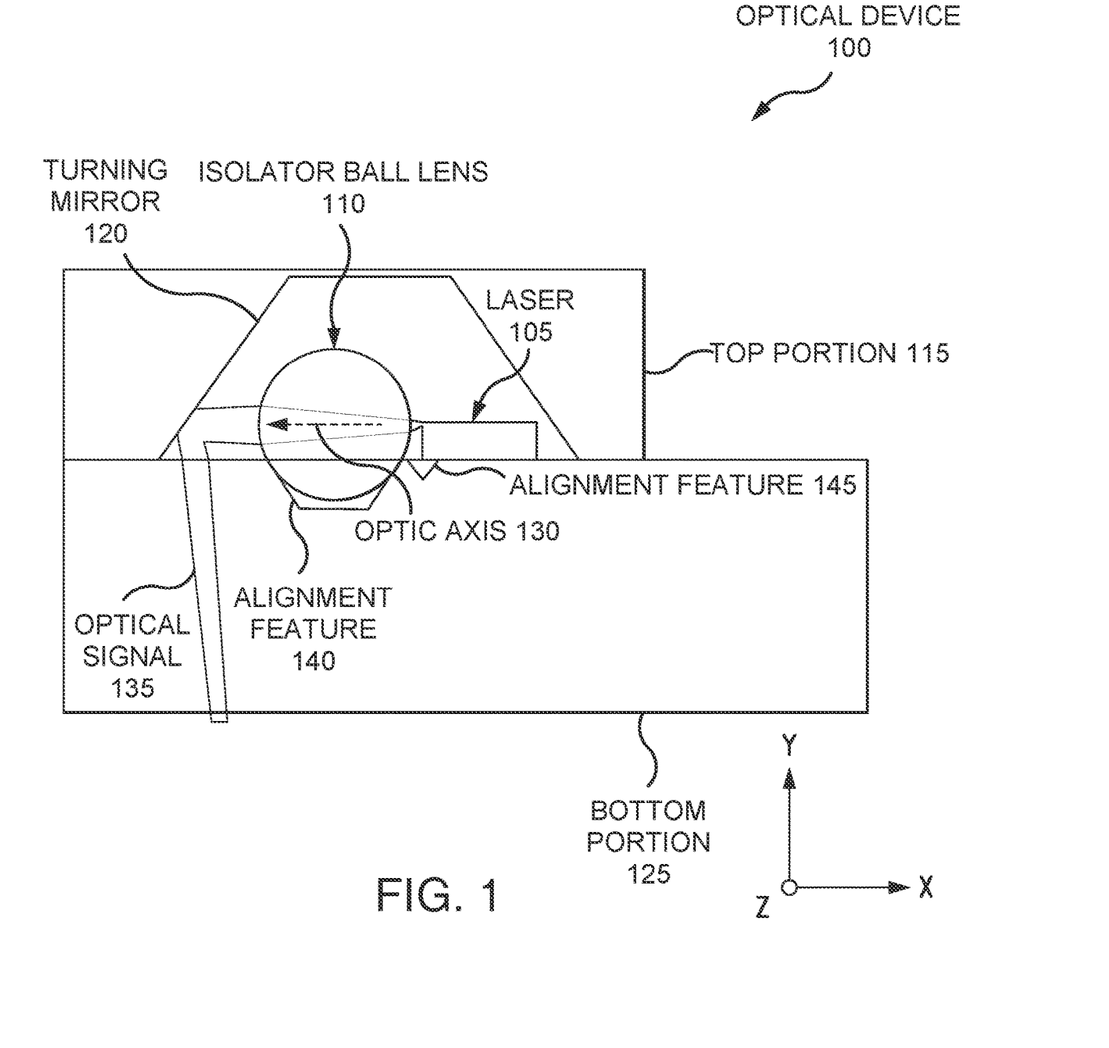

FARADAY ROTATOR BALL LENS

TECHNICAL FIELD

Embodiments presented in this disclosure generally relate to Faraday rotator ball lenses, and more specifically, to aligning the lenses before being placed in optical devices.

BACKGROUND

Optical communication has revolutionized how information is transmitted. Mass-produced semiconductor lasers transmit multiple-wavelength optical signals over low-loss, low-dispersion optical fibers, modulated at multi-gigabit per second (GB/s) rates, for hundreds of kilometers. Text, voice, audio, and video data are transmitted around the globe utilizing optical fibers, supporting both wired and wireless communication systems.

Optical fiber communication has moved into lower cost, yet still high performance applications, such as metro access networks and enterprise LAN backbones. Single-mode fiber (SMF) is poised to replace short copper links in high data rate, 10 GB/s and above, applications.

As data networks scale to meet ever-increasing bandwidth requirements, the shortcomings of copper data channels are becoming apparent. Signal attenuation and crosstalk due to radiated electromagnetic energy are the main impediments encountered by designers of such systems. They can be mitigated to some extent with equalization, coding, and shielding, but these techniques require considerable power, complexity, and cable bulk penalties while offering only modest improvements in reach and very limited scalability. Free of such channel limitations, optical communication has been recognized as the successor to copper links.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 1 is a schematic of an optical device including a laser, an isolator ball lens, and a turning mirror incorporated in a hermetically sealed package, according to one embodiment described herein.

FIG. 2 is a flowchart for aligning an optic axis of an isolator ball lens, according to one embodiment described herein.

FIGS. 3A-3C illustrate steps for aligning an optic axis of an isolator ball lens, according to one embodiment described herein.

FIG. 4 is a flowchart for aligning a plurality of isolator ball lens, according to one embodiment described herein.

FIG. 5 is a vacuum device that arranges a plurality of isolator ball lenses into a grid, according to one embodiment described herein.

FIG. 6 is a membrane for holding a plurality of aligned isolator ball lenses, according to one embodiment described herein.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure is a method that includes positioning a ball lens in a holder where the ball lens is a Faraday rotator and vibrating the holder or applying aerodynamic levitation to the ball lens while generating a magnetic field in a desired direction of an optic axis of the ball lens so that the ball lens rotates until that the optic axis is in the desired direction.

Another embodiment presented in this disclosure is a method that includes arranging a plurality of ball lenses in an array in a device where the plurality of ball lenses are Faraday rotators and vibrating the device or applying aerodynamic levitation to the plurality of ball lenses while applying a magnetic field, the magnetic field causing the plurality of ball lenses to rotate.

Another embodiment presented in this disclosure is a method that includes positioning a Faraday rotator ball lens in a holder and vibrating the holder or applying aerodynamic levitation to the Faraday rotator ball lens while generating a magnetic field so that the Faraday rotator ball lens rotates to align an optic axis of the Faraday rotator ball lens with the magnetic field.

EXAMPLE EMBODIMENTS

Embodiments here describe a Faraday rotator ball lens that can be used in an optical device to perform two functions: focus received light and as an isolator to prevent back reflections from reaching a light source (e.g., a laser). Previous optical devices use a ball lens and a separate isolator element (e.g., a Faraday rotator), but the embodiments herein omit the separate isolator element by using a Faraday rotator ball lens. As such, the Faraday rotator ball lens is also referred to as an isolator ball lens.

In one embodiment, the isolator ball lens includes an optic axis that should be aligned with the direction of the received light in order to rotate the light so that back reflections cannot reach the light source. To do so, the isolator ball lens is placed on a holder which is then vibrated, shaken, and/or air-levitated in the presence of a magnetic field. The magnetic field is aligned with a desired direction of the optic axis of the isolator ball lens. As a result, when the ball lens (which is magnetic) is vibrated or levitated, the magnetic field rotates the ball lens and aligns its optic axis in the desired direction. The ball lens can then be placed in the optical device with its optic axis arranged in the correct direction.

FIG. 1 is a schematic of an optical device 100 including a laser 105, an isolator ball lens 110, and a turning mirror 120 incorporated in a hermetically sealed package, according to one embodiment described herein. As shown, the optical device 100 includes a top portion 115 and a bottom portion 125. In one embodiment, the top portion 115 and the bottom portion 125 are respective semiconductor wafers (e.g., silicon wafers) that are bonded together to form the hermetically sealed package that includes the laser 105 and the isolator ball lens 110.

Before being bonded to the top portion 115, the bottom portion 125 can be etched to form an alignment feature 140 for the ball lens 110. One advantage of using a ball lens 110 to focus an optical signal 135 received from the laser 105 is that precise semiconductor fabrication etching techniques can be used to form the alignment feature 140 in the bottom portion 125. In this example, the alignment feature 140 is a frustopyramidal (or a pyramidal frustum) shape which has dimensions so that a portion of the ball lens 110 sits in the feature 140, but does not contact the bottom of the feature 140. When placed in the alignment feature 140, the ball lens 110 self-aligns with the laser 105. Put differently, by controlling the dimensions of the alignment feature 140 (and assuming the diameter of the ball lens 110 is also tightly controlled), placing the ball lens 110 in the feature 140 aligns the height (Y-direction) and the location (X- and Z-directions) of the ball lens 110 to the laser 105. While other types of isolator lenses could be used in the optical device 100 (e.g., convex and concave lenses), these lenses may be harder to align to the laser 105.

After passing through the ball lens 110, the optical signal 135 is reflected by a turning mirror 120 formed in one of the sides of the top portion 115. The turning mirror 120 reflects the optical signal 135 down through the bottom portion 125 which can be formed from a material that is transparent to the optical signal 135. Although not shown, the optical device 100 can be bonded or coupled to another optical device that includes an optical interface (e.g., a grating coupler) that aligns with the optical signal 135 after passing through the bottom portion 125.

As mentioned above, the optical device 100 (or the optical device to which it is coupled) can generate back reflections that propagate in the opposite direction of the optical signal 135, which are undesirable. The ball lens 110 can be manufactured using a material that rotates these back reflection so their polarization is perpendicular to the laser beam emitted by laser 105. The ball lens 110 may reduce and/or eliminate optical feedback to the laser 105 by rotating any reflected optical signal another 45 degrees for a total of 90 degrees from the optical mode emitted by the laser 105 to reduce and/or eliminate feedback effects. That is, in one embodiment, the ball lens 110 first rotates the optical signal 135 45 degrees when it first passes through the lens 110. Any back reflections are rotated an additional 45 degrees in the same rotational direction for a total of 90 degrees. Light with a 90 degree rotation relative to the optical signal 135 emitted by the laser 105 has little to no effect on the laser 105. An insensitive laser could be used as the laser 105 in which case the isolator properties of the ball lens 110 could be omitted, but these types of lasers are much more expensive.

In one embodiment, the isolator ball lens 110 includes reciprocal and/or non-reciprocal polarization rotation capability that enables rotation of the polarization vector of the optical beam generated by the laser 105. The non-reciprocal capability of the isolator ball lens 110 may include a Faraday rotator. In one embodiment, ball lens 110 comprises garnet. In one embodiment, the ball lens 110 comprises iron garnet.

In one embodiment, the ball lens 110 is formed from a latched magneto-optic material (e.g., a latched iron-garnet). A latched magneto-optic material remains magnetic after being poled by a magnetic field. Thus, ball lenses formed from latched materials do not need to be in the presence of a permanent magnet to maintain their properties as an isolator.

In one embodiment, the ball lens 110 has a diameter that ranges from 200-500 microns. In another embodiment, the ball lens 110 has a diameter that ranges from 300-400 microns.

The light source assembly may be hermetically sealed where the top portion 115 (e.g., a lid) is affixed via solder, epoxy, or glass frit to the bottom portion 125. Hermetic sealing of laser 105, the ball lens 110, and the turning mirror 120 may increase device lifetime by reducing or eliminating environmental effects on the optical elements in the assembly.

While FIG. 1 illustrates redirecting the light down through the bottom portion 125, using the isolator ball lens 110 in combination with a light source (e.g., the laser 105) can be applied to any suitable optical device. For example, instead of reflecting the light downwards in the Y-direction, the light may be emitted through the top portion 115 in the X-direction (assuming the top portion 115 does not have an angled internal facet).

Further, while the embodiments discuss using a spherical ball lens 110, other types of lens can be used, which may lead to several advantages. For example, as discussed above, using an isolator ball lens 110 may enable self-alignment using the alignment feature 140. However, with an isolator ball lens 110, its rotation properties and its focusing properties are tied to the same dimension—the thickness of the ball lens 110 (i.e., its diameter). Thus, both the desired focusing provided by the ball lens 110 and the rotation (e.g., 45 degree rotation) of the optical signal 135 depend on the diameter of the ball lens 110. However, with other lens types (e.g., convex/concave lenses) their focusing properties and the Faraday rotation can be decoupled so they can be designed independently. Thus, the embodiments herein are not limited to isolator ball lens and can include optical devices with convex or concave lenses that both focus the optical signal and function as Faraday rotators.

The laser 105 may be a semiconductor laser diode, for example, and may be coupled epi-side up on a top surface of the bottom portion 125. The laser 105 may emit light at a wavelength that corresponds to the appropriate wavelength of light for the optical transceivers integrated in a complementary metal oxide semiconductor (CMOS) chip or an optical fiber cable.

The bottom portion 125 also includes an alignment feature 145 for the laser 105. Using the alignment feature 145 and bonding the laser 105 epi-side down enables accurate height control of the optical signal from the laser 105 with the ball lens 110. In addition, the laser 105 mounted epi-side down allows for better heat transfer to the large thermal mass of the laser 105 substrate as well as into the alignment feature 145.

Figure 2:
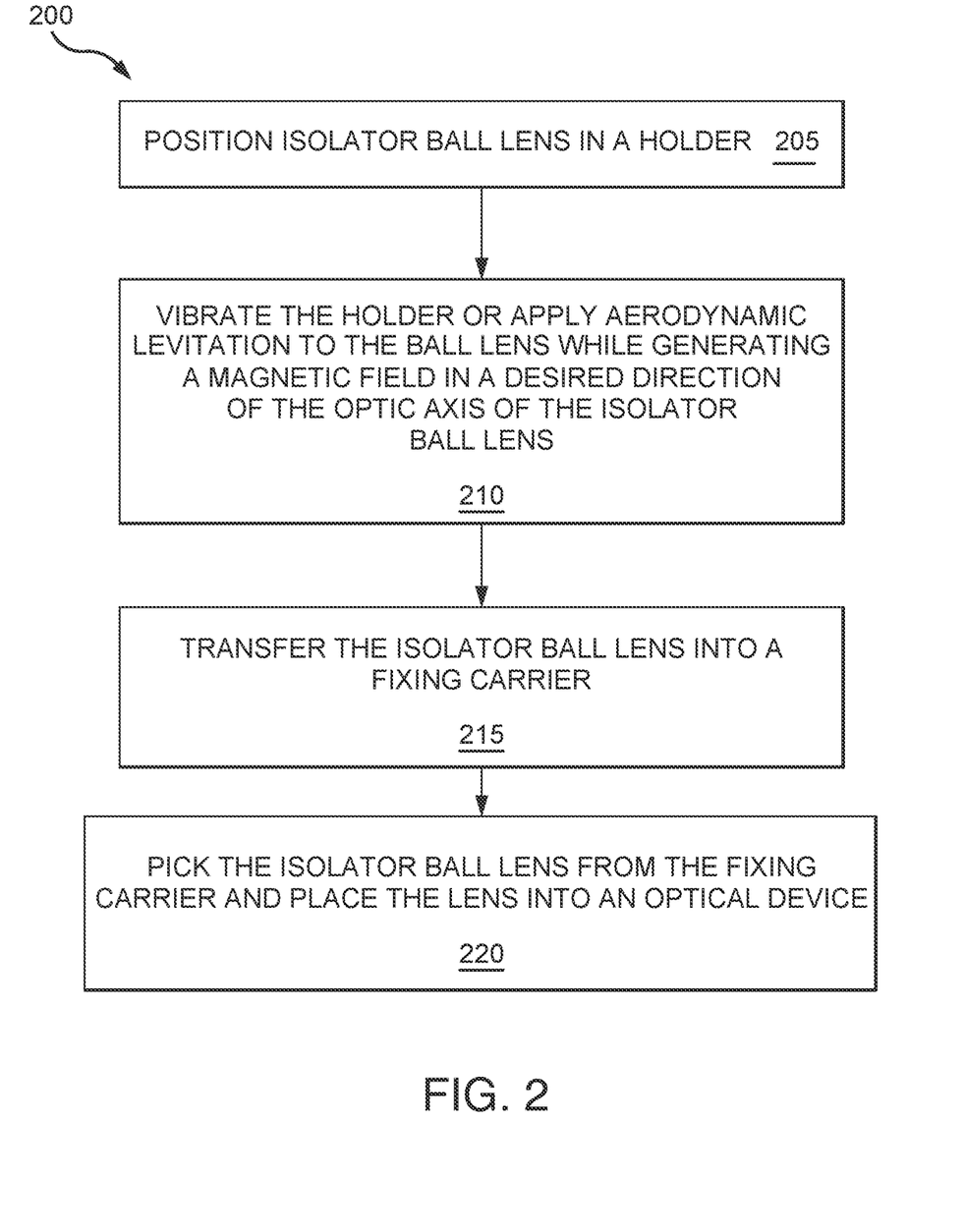

FIG. 2 is a flowchart of a method 200 for aligning an optic axis of an isolator ball lens, according to one embodiment described herein. Referring to FIG. 1, the optic axis 130 of the ball lens 110 is aligned in the same or similar direction as the optical signal 135 when emitted by the laser 105. This ensures the ball lens 110 provides the desired rotation on the optical signal 135 to prevent back reflections from affecting the laser 105. For example, if the optic axis 130 was instead facing upwards in the Y-direction, then the ball lens 110 would provide little if any rotation on the optical signal as it passes through or on the back reflections, and as such, the back reflections would affect the operation of the laser 105. The method 200 discussed in FIG. 2 describes techniques for aligning the optic axis 130 so that it is aligned with the optical signal received by the ball lens 110 so it rotates the optical signal.

At block 205, an isolator ball lens (e.g., the ball lens 110 in FIG. 1) is positioned in a holder. This can be performed by a technician or could be performed by an automated process that loads ball lens onto the holder. However, the direction of the optic axis of the ball lens may be unknown.

Figure 3A:
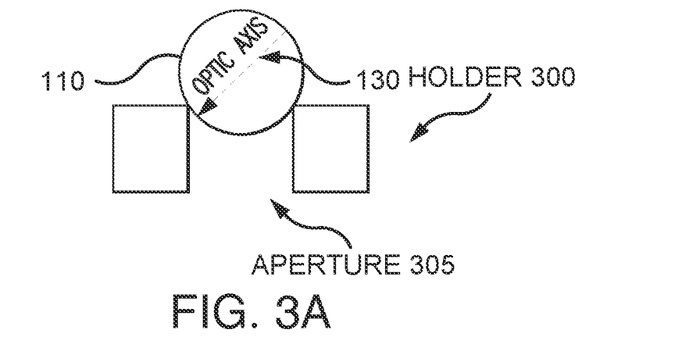

The holder can be any device that holds the ball lens in a fixed position. FIG. 3A illustrate one example of a holder 300. Specifically, FIG. 3A illustrates a cross sectional view of the isolator ball lens 110 and the holder 300. In one embodiment, the holder 300 may define a circular or rectangular aperture 305 where a diameter of the aperture 305 is smaller than a diameter of the ball lens 110. As such, a portion of the ball lens 110 rest in the aperture 305 while the remaining portion of the ball lens 110 rests above the holder 300. In one embodiment, a vacuum is created in the aperture 305 so that the ball lens 110 is held in the aperture 305 even if the holder 300 is rotated in the X-Y plane. However, using a vacuum to hold the ball lens 110 on the holder 300 is not required.

Rather than a circular or rectangular aperture 305, in other embodiments, the holder 300 may instead form a frustoconical or frustopyrmadial shape using its inner surfaces to hold the ball lens 110. The embodiments herein can be used with any suitable holder that can hold the ball lens 110 such that at least some portion of the ball lens 110 remains above a top surface of the holder 300. Doing so enables the ball lens to be later removed from the holder 300.

FIG. 3A illustrates the optic axis 130 facing in an undesired direction—i.e., in a direction that does not align with the direction in which the ball lens 110 will receive the optical signal from the laser. For example, when the ball lens 110 is initially positioned on the holder 300, the optic axis 130 may have a random orientation which is unknown. The method 200 aligns the optic axis 130 in a desired (or known) direction or orientation.

Figure 3B:
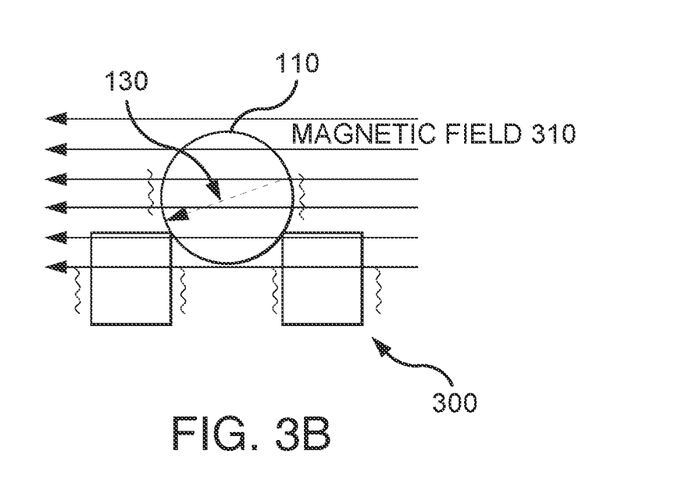

Returning to FIG. 2, at block 210, the holder is vibrated using an actuator, or an aerodynamic levitation is applied, while generating a magnetic field in a desired direction of the optic axis of the isolator ball. FIG. 3B illustrates vibrating the holder 300 while applying a magnetic field 310. Vibrating the holder 300 reduces the friction between the ball lens 110 and the holder 300 which permits the ball lens 110 to change its orientation relative to the holder 300. That is, the ball lens 110 can rotate. If the holder uses a vacuum to hold the ball lens, the vacuum may be deactivated (or reduced) during block 210 to permit the ball lens 110 to rotate in the holder 300. Because the ball lens 110 is magnetic, the magnetic field 310 urges the ball lens 110 to rotate so that the optic axis 130 becomes more aligned with the field lines of the magnetic field 310.

Figure 3C:
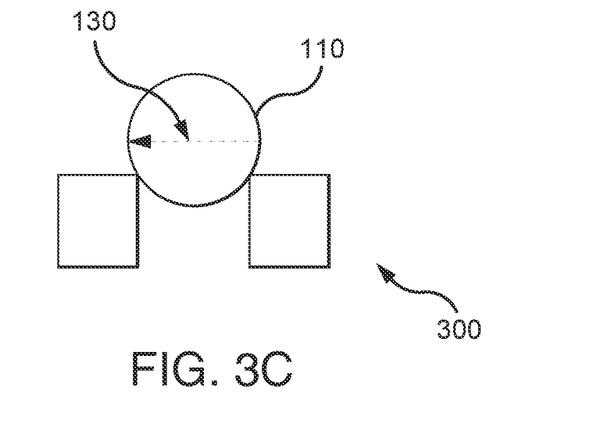

In one embodiment, the field lines of the magnetic field 310 are generated with the same orientation of the desired orientation of the optic axis 130. Thus, as the ball lens 110 rotates, the optic axis 130 eventually aligns with the field lines of the magnetic field 310, and thus, the optic axis 130 is now in the desired (or known) direction. This is shown in FIG. 3C where the optic axis 130 now has an optic axis that aligns with the direction in which the optical signal passes through the ball lens 110 as shown in FIG. 1.

In one embodiment, the holder 300 is vibrated with enough force or sufficient frequency to reduce the friction between the lens 110 and the sides of the holder 300 so that the lens 110 can be rotated, but not with too much force where the lens 110 may roll out of the holder 300. The size of the aperture 305 and the vibrational force may be balanced so the lens 110 can rotate to align its optic axis 130 with the magnetic field 310 but without rolling out of the holder 300.

In another embodiment, instead of, or in addition to vibrating the holder 300, the holder 300 applies an aerodynamic levitation on the lens 110. For example, a positive pressure airflow can be applied in the aperture 305 which causes the ball lens 110 to levitate. This reduces or removes the friction between the lens 110 and the sides of the holder 300 so that the lens 110 can be rotated as discussed above to align its optic axis 130 with the magnetic field 310. The positive pressure can be controlled so that it still keeps the ball lens 110 from rolling out of the holder 300.

Returning to FIG. 2, at block 215, the isolator ball lens is transferred from the holder into a fixing carrier that is compatible with an automated pick and place tooling process. In one embodiment, the fixing carrier may be a gel type substance which can be pressed down on top of the ball lens while the ball lens is in the holder. Referring to FIG. 3C, the fixing carrier may be pressed down such that a top portion of the lens 110 sinks into the fixing carrier. The fixing carrier may be tacky so that when the fixing carrier is lifted away from the holder 300, the ball lens 110 remains embedded in, or attached to, the fixing carrier.

In one embodiment, the ball lens 110 cannot rotate (or at least it is difficult to rotate) when embedded in the fixing carrier. This means that the optic axis 130 remains oriented in a direction that is parallel with the surface of the fixing carrier in which the ball lens 110 is embedded. This enables the fixing carrier (and the embedded ball lens) to be moved around without the optic axis 130 changing to an unknown orientation.

At block 220, a pick and place tool picks the isolator ball lens from the fixing carrier and places the lens into an optical device. The pick and place tool may be operated by a technician and the tool may be automated (e.g., using a computer vision system).

In one embodiment, the pick and place tool places the isolator ball lens in an optical device such as the one shown in FIG. 1. For example, the pick and place tool may place the ball lens in the alignment feature 140. Before doing so, adhesive may be dispensed in the alignment feature 140 so that the isolator ball lens is held in the alignment feature.

Based on the orientation of the fixing carrier, the pick and place tool can ascertain the orientation of the optic axis 130 of the ball lens 110. That is, the orientation of the optic axis 130 relative to the fixing carrier is known, thus, by knowing the orientation of the fixing carrier, the pick and place tool can determine the orientation of the optic axis 130. The pick and place tool can then, when moving and placing the ball lens 110 in the alignment feature 145, ensure that the optic axis 130 is arranged in the desired direction in the optical device 100—e.g., in the same direction at which the light is received from the laser 105. In this manner, the optic axis 130 can be arranged in a desired direction.

While the method 200 describes using a fixing carrier, in other embodiments, this step(s) could be omitted. For example, the pick and place tool could directly remove the isolator ball lens from the holder after block 210 and place the place the ball lens in the optical device.

Figure 4:
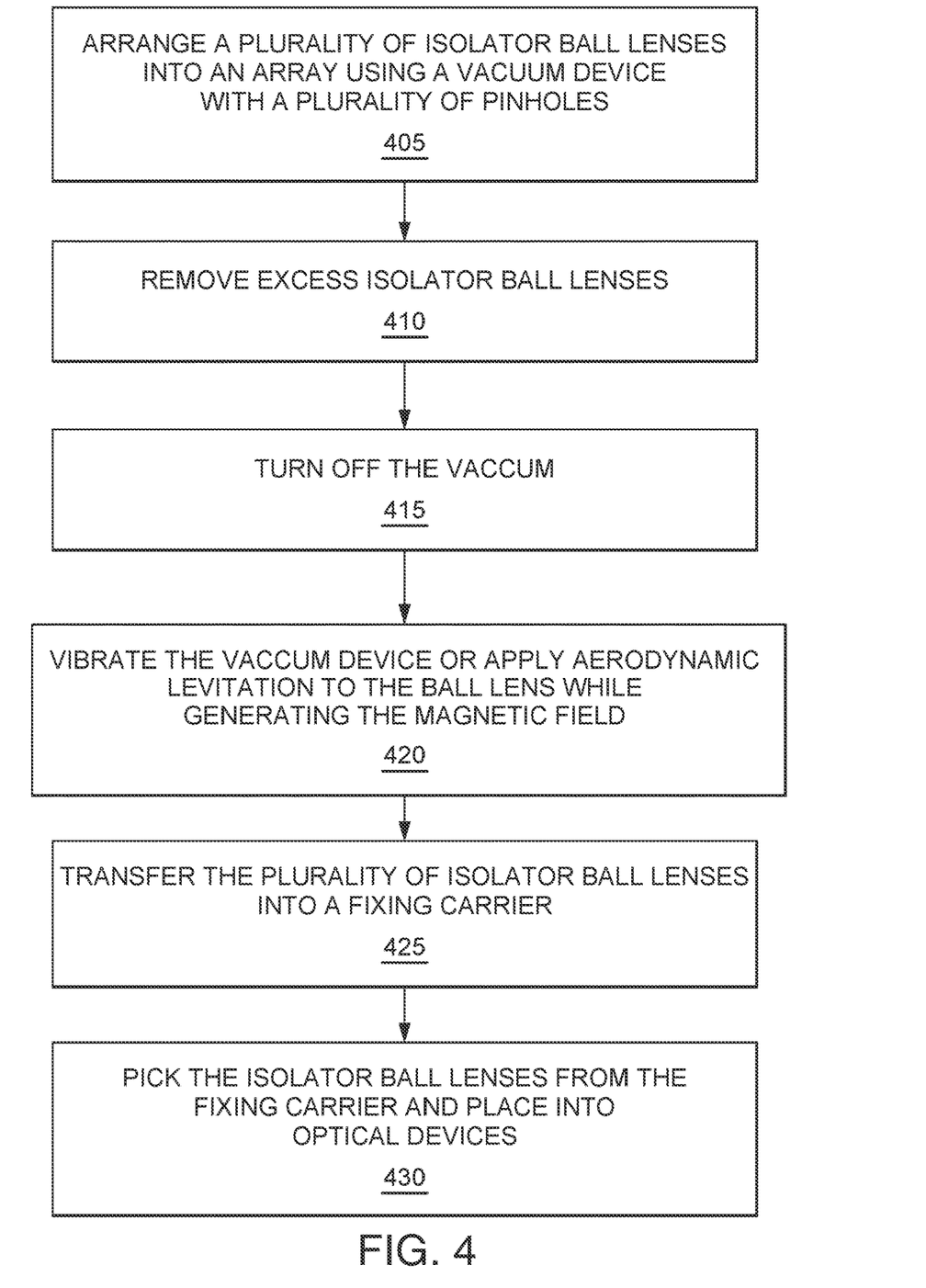

FIG. 4 is a flowchart of a method for aligning a plurality of isolator ball lens, according to one embodiment described herein. At block 405, a plurality of isolator ball lenses are arranged into an array using a vacuum device with a plurality of pinholes. This can be performed by a technician or could be performed by an automated process that loads ball lens onto the vacuum.

Figure 5:
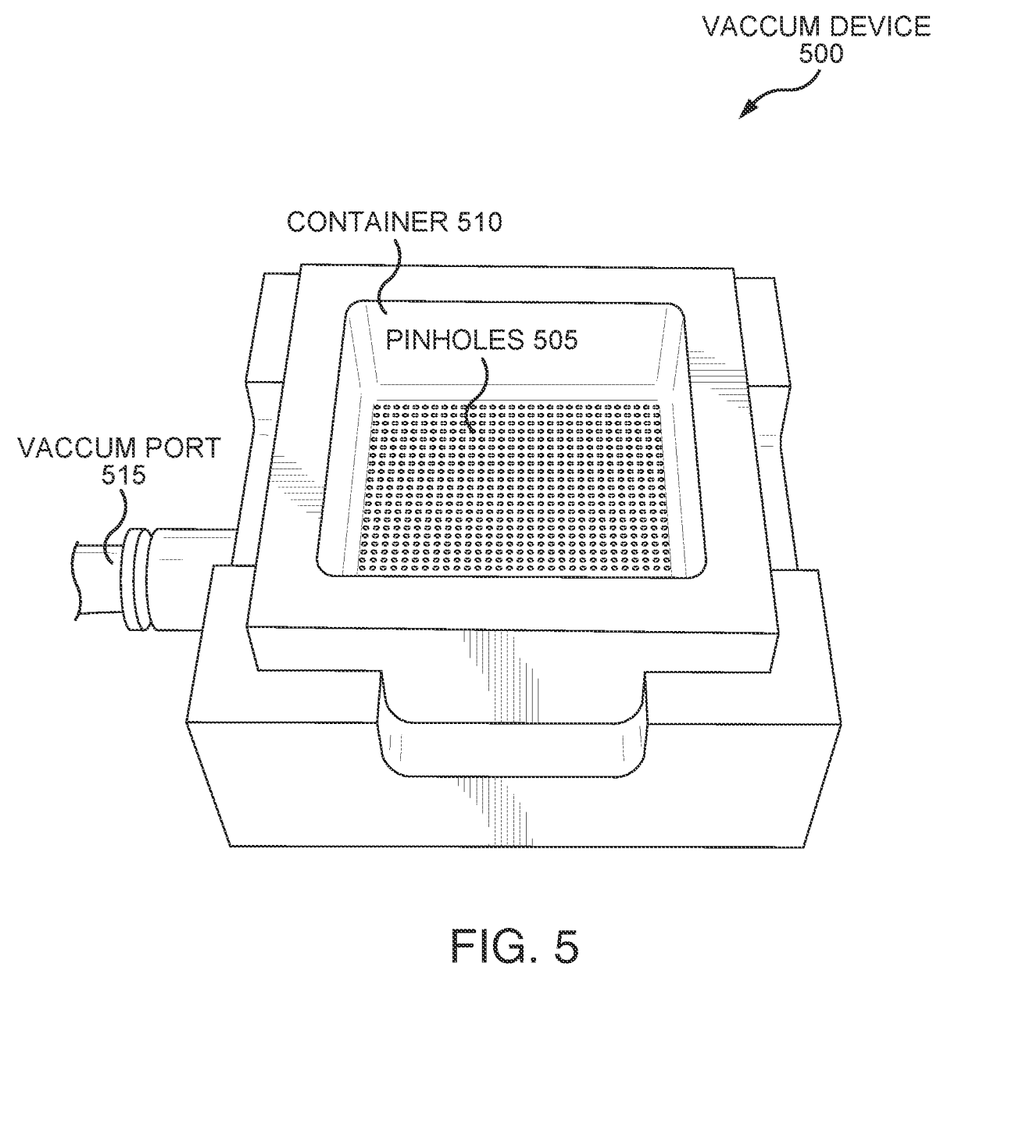

In one embodiment, the vacuum device pulls air through the plurality of pinholes so that when a loose ball lens rolls over a pinhole it is held on top of the pinhole by the vacuum. FIG. 5 is one example of a vacuum device 500 that aligns a plurality of isolator ball lenses into a grid, according to one embodiment described herein. The vacuum device 500 includes a container 510 where a bottom surface includes a plurality of pinholes 505. The pinholes 505 can have any of the shapes or sizes as discussed above regarding the holder 300 in FIG. 3.

The pinholes 505 form an array on the bottom surface of the container 510. In one embodiment, the ball lenses are poured into the container as a vacuum port 515 pulls air through the pinholes 505. In one embodiment, the vacuum port 515 can be used to introduce positive pressure to levitate the ball lenses. As the ball lenses roll in the container 510 (as it shaken or rotated) they eventually roll into a pinhole 505 where the vacuum creates a force that holds a respective ball lens in each of the pinholes 505. In one embodiment, the vacuum device is rotated to move the ball lenses around the bottom of the container until a ball lens is disposed on top of each of the pinholes 505. The force created by the vacuum can be sufficient to hold the ball lenses in respective pinholes 505 while the vacuum device 500 is rotated until a ball lens is disposed in each pinhole 505.

Returning to FIG. 4, at block 410 excess isolator balls are removed from the vacuum device. For example, any extra ball lenses can be poured out of the container 510 of the vacuum device 500 in FIG. 5. That is, if more ball lenses were poured into the container 510 than there are pinholes 505, these extra ball lenses can be poured out of the container 510 without the balls lenses already disposed on the pinholes 505 also falling out of the container 510 due to the vacuum.

As a result of the ball lenses becoming disposed in the pinholes 505, the ball lenses are formed in an array like the pinholes 505.

At block 415, the vacuum can be turned off in the vacuum device. In one embodiment, the vacuum is disabled after the vacuum device has been placed on a flat surface. For example, the bottom surface of the container 510 in the vacuum device 500 may be parallel with the earth's surface. Thus, even if the vacuum is not applied, gravity holds the ball lenses in the pinholes. For example, the pinholes and the ball lenses may have a similar cross section as the one shown in FIG. 3A where a portion of the ball lens 110 lies within the aperture 305 while the remaining portion of the ball lens 110 lies above the holder 300 (e.g., a pinhole).

Moreover, because the orientations of the optic axes of the ball lenses may have been unknown when being poured into the vacuum device, these orientations are still unknown after the ball lenses have been disposed in respective pinholes at block 405. Stated differently, the optic axes of ball lenses in the pinholes may have random orientations.

At block 420, the vacuum device is vibrated, or an aerodynamic levitation is applied to the ball lenses, while generating the magnetic field. For example, the vacuum device can be vibrated which vibrates each of the pinholes which is shown in FIG. 3B. Vibrating the vacuum device, or more specifically, the pinholes in the device, reduces the friction between the ball lenses and the sides of the pinholes which permits the ball lenses to change their orientation relative to the vacuum device. Alternatively or additionally, a positive pressure can be applied in the pinholes which causes the ball lenses to levitate thereby permitting them to more easily rotate. Because the ball lenses are magnetic, the magnetic field urges the ball lenses to rotate so that the optic axes become aligned with the field lines of the magnetic field.

As discussed above, the field lines of the magnetic field are generated with the same orientation of the desired orientation of the optic axis. Thus, as the ball lenses rotates, their optic axes eventually align with the field lines of the magnetic field, and thus, the optic axes are now in the desired (or known) direction. This is shown in FIG. 3C.

In one embodiment, the vacuum device is vibrated with enough force or sufficient frequency to reduce the friction between the lenses and the sides of the pinholes so that the lenses can rotate, but not with too much force where the lenses may roll out of the pinholes.

At block 425, the array of isolator balls are transferred into a fixing carrier. Although not required, the vacuum may be reactivated when the isolator balls are being embedded in the fixing carrier.

Referring to FIG. 5, a fixing carrier with a similar (or smaller) width and length as the container 510 can be pushed into the container until the fixing carrier contacts the array of ball lenses at the bottom of the container 510. The fixing carrier can be pushed down into the container so that the ball lenses become partially embedded in the fixing carrier. The fixing carrier can be slightly sticky or have an adhesive so that the ball lenses are stuck to the fixing carrier. If the vacuum was activated, it can then be deactivated and the fixing carrier can then be pulled out of the container 510.

Figure 6:
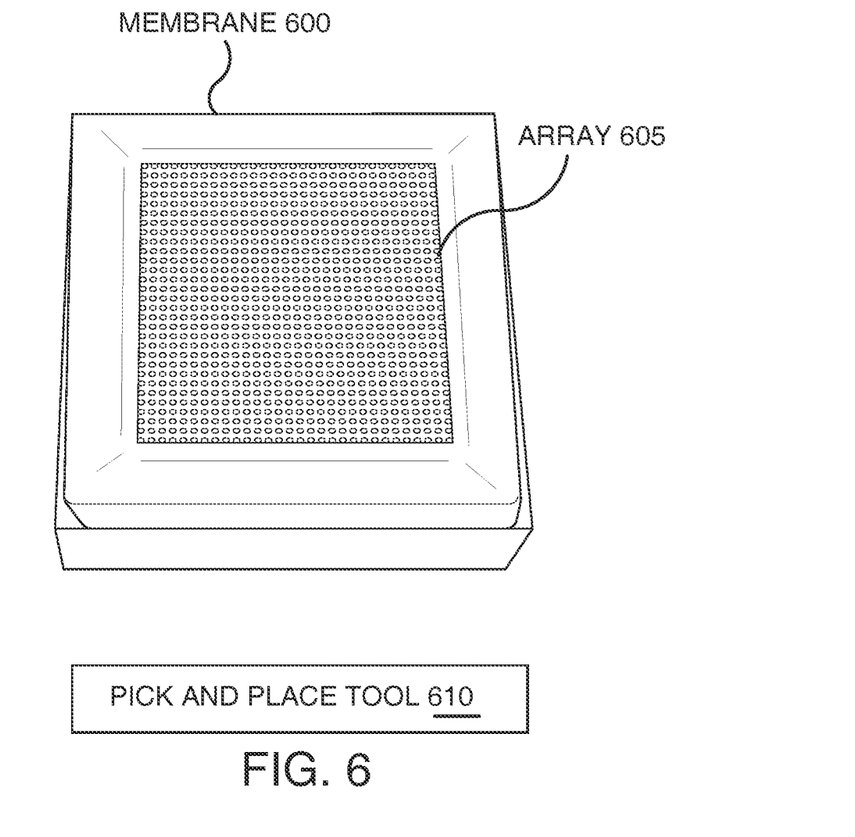

FIG. 6 is a membrane 600 (e.g., one type of fixing carrier) for holding a plurality of aligned isolator ball lenses, according to one embodiment described herein. That is, an array 605 of isolator ball lenses are partially embedded or stuck on a surface of the membrane 600. In one embodiment, the spacing of the ball lenses in the array 605 is the same spacing as the pinholes in the vacuum device 500 in FIG. 5.

In one embodiment, the optic axes of the ball lenses in the array 605 are oriented in the same direction. In one embodiment, one side of the membrane 600 can be marked to indicate that the optic axes of the ball lenses in the array 605 point at that side.

Returning to FIG. 4, at block 430 the pick and place tool (e.g., the pick and place tool 610 in FIG. 6) picks the isolator ball lenses from the fixing carrier and places them into respective optical devices. The pick and place tool may be operated by a technician and the tool may be automated (e.g., using a computer vision system). In one embodiment, the pick and place tool includes a robotic arm that may be guided by a computer vision system.

In one embodiment, the pick and place tool places the isolator ball lenses in a respective optical device such as the one shown in FIG. 1. For example, the pick and place tool may place each the ball lens in a corresponding alignment feature 140.

Based on the orientation of the fixing carrier, the pick and place tool can ascertain the orientation of the optic axis of the ball lens. That is, the orientation of the optic axis relative to the fixing carrier is known, thus, by knowing the orientation of the fixing carrier, the pick and place tool can determine the orientation of the optic axis. The pick and place tool can then, when moving and placing the ball lens in the alignment feature, ensure that the optic axis is arranged in the desired direction in the optical device—e.g., in the same direction at which the light is received from the laser. In this manner, the optic axis can be arranged in a desired direction.

Some or all of the blocks in the methods in FIGS. 2 and 4 can be driven or controlled by a computing system. The computing system can include one or more software applications that automate some or all of the blocks in the methods in FIGS. 2 and 4 so these blocks can be performed without human intervention. For example, one or more software applications can control robotic arms, actuators, and the like to perform the blocks in the methods in FIGS. 2 and 4.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   positioning a ball lens in a holder, wherein the ball lens is a Faraday rotator; and
   vibrating the holder or applying aerodynamic levitation to the ball lens while generating a magnetic field in a desired direction of an optic axis of the ball lens so that the ball lens rotates until the optic axis is in the desired direction.

2. The method of claim 1, wherein positioning the ball lens in the holder comprises:
   applying a vacuum to hold the ball lens in the holder.

3. The method of claim 2, further comprising, before vibrating the holder or applying aerodynamic levitation to the ball lens:
   deactivating the vacuum.

4. The method of claim 1, further comprising, after aligning the optic axis in the desired direction:

transferring the ball lens into a fixing carrier by pressing the fixing carrier on the ball lens while the ball lens is in the holder.

5. The method of claim 4, further comprising:
picking the ball lens from the fixing carrier and placing the ball lens in an optical device using a pick and place tool.

6. The method of claim 1, wherein the ball lens comprises a magneto-optic material.

7. The method of claim 6, wherein the ball lens comprises iron-garnet.

8. The method of claim 1, wherein the ball lens comprises a latched material.

9. A method, comprising:
arranging a plurality of ball lenses in an array in a device, wherein the plurality of ball lenses are Faraday rotators; and
vibrating the device or applying aerodynamic levitation to the plurality of ball lenses while applying a magnetic field, the magnetic field causing the plurality of ball lenses to rotate.

10. The method of claim 9, wherein the magnetic field causes the plurality of ball lenses to rotate until their respective optic axes are aligned with the magnetic field.

11. The method of claim 10, further comprising, after aligning the optic axes with the magnetic field:
transferring the plurality of ball lenses into a fixing carrier by pressing the fixing carrier on the plurality of ball lenses while the plurality of ball lenses is on the device, wherein the optic axes of the plurality of ball lenses have a same orientation when attached to the fixing carrier.

12. The method of claim 11, further comprising:
picking the plurality of ball lenses from the fixing carrier and placing the plurality of ball lenses in optical devices using a pick and place tool.

13. The method of claim 9, wherein the device comprises a plurality of pinholes in an array, wherein each one of the plurality of ball lenses is in a respective one of the plurality of pinholes.

14. The method of claim 13, wherein arranging the plurality of ball lenses in the array in the device comprises:
pulling a vacuum through each of the plurality of pinholes to hold the plurality of ball lenses in the plurality of pinholes.

15. The method of claim 14, further comprising, before vibrating the device or applying aerodynamic levitation to the plurality of ball lens while applying a magnetic field:
deactivating the vacuum.

16. The method of claim 9, wherein each of the plurality of the ball lenses comprises a magneto-optic material.

17. The method of claim 16, wherein each of the plurality of the ball lenses comprises iron-garnet.

18. The method of claim 9, wherein each of the plurality of the ball lenses comprises a latched magneto-optic material.

19. A method, comprising:
positioning a Faraday rotator ball lens in a holder; and
vibrating the holder or applying aerodynamic levitation to the Faraday rotator ball lens while generating a magnetic field so that the Faraday rotator ball lens rotates to align an optic axis of the Faraday rotator ball lens with the magnetic field.

20. The method of claim 19, wherein positioning the Faraday rotator ball lens in the holder comprises:
applying a vacuum to hold the Faraday rotator ball lens in the holder,
wherein the method further comprises, before vibrating the holder or applying aerodynamic levitation to the Faraday rotator ball lens:
deactivating the vacuum.

* * * * *